(12) United States Patent
Yasuda et al.

(10) Patent No.: US 9,169,392 B2
(45) Date of Patent: *Oct. 27, 2015

(54) COMPOSITE MATERIAL BASED ON POLYAMIDE AND ON POLY(LACTIC ACID), MANUFACTURING PROCESS AND USE THEREOF

(75) Inventors: Maho Yasuda, Kagawa (JP); Nicolas Amouroux, Reims (FR); Benoit Brule, Beaumont-le-Roger (FR); Nadine Decraemer, Beaumontel (FR); Jean-Jacques Flat, Goupillieres (FR)

(73) Assignee: ARKEMA FRANCE, Colombes (FR)

( * ) Notice: Subject to any disclaimer, the term of this patent is extended or adjusted under 35 U.S.C. 154(b) by 876 days.

This patent is subject to a terminal disclaimer.

(21) Appl. No.: 12/524,691

(22) PCT Filed: Jan. 29, 2008

(86) PCT No.: PCT/FR2008/050139
§ 371 (c)(1),
(2), (4) Date: Oct. 29, 2009

(87) PCT Pub. No.: WO2008/107615
PCT Pub. Date: Sep. 12, 2008

(65) Prior Publication Data
US 2010/0087585 A1    Apr. 8, 2010

(30) Foreign Application Priority Data

Jan. 29, 2007 (FR) ..................... 07 52942

(51) Int. Cl.
| | | |
|---|---|---|
| *C08L 77/00* | (2006.01) | |
| *C08L 67/04* | (2006.01) | |
| *C08L 23/08* | (2006.01) | |
| *B29C 43/00* | (2006.01) | |
| *B29C 45/00* | (2006.01) | |
| *B29C 47/00* | (2006.01) | |
| *B29C 51/00* | (2006.01) | |
| *C08L 77/02* | (2006.01) | |
| *C08J 5/10* | (2006.01) | |
| *C08L 77/06* | (2006.01) | |
| *C08K 7/14* | (2006.01) | |

(52) U.S. Cl.
CPC .. *C08L 77/02* (2013.01); *C08J 5/10* (2013.01); *C08L 67/04* (2013.01); *C08L 77/00* (2013.01); *C08L 77/06* (2013.01); *C08J 2377/00* (2013.01); *C08J 2377/02* (2013.01); *C08J 2377/06* (2013.01); *C08K 7/14* (2013.01); *C08L 23/0869* (2013.01); *C08L 23/0884* (2013.01)

(58) Field of Classification Search
CPC ..... C08L 77/00; C08L 67/04; C08L 23/0869; B29C 43/00; B29C 45/00; B29C 47/00; B29C 51/00
USPC .......... 524/494, 514, 847; 525/178, 184, 418, 525/419, 420
See application file for complete search history.

(56) References Cited

U.S. PATENT DOCUMENTS

| | | | |
|---|---|---|---|
| 4,174,358 A | | 11/1979 | Epstein |
| 5,272,221 A | * | 12/1993 | Kitao et al. .................... 525/420 |
| 7,015,261 B1 | * | 3/2006 | Zerafati et al. ................. 523/201 |
| 7,268,190 B2 | * | 9/2007 | Ohme et al. .................... 525/400 |
| 7,354,973 B2 | | 4/2008 | Flexman |
| 7,381,772 B2 | | 6/2008 | Flexman et al. |
| 8,455,583 B2 | * | 6/2013 | Krishnamoorti et al. ..... 524/496 |
| 2004/0242803 A1 | * | 12/2004 | Ohme et al. .................... 525/400 |
| 2010/0113677 A1 | * | 5/2010 | Brule et al. .................... 524/528 |

FOREIGN PATENT DOCUMENTS

| | | |
|---|---|---|
| JP | 9316310 | 12/1997 |
| JP | 2003277594 | 10/2003 |
| JP | 2004051835 | 2/2004 |
| WO | WO 03014224 A1 * | 2/2003 |
| WO | WO 2006096203 A2 * | 9/2006 |

* cited by examiner

*Primary Examiner* — Ling Choi
*Assistant Examiner* — Ronald Grinsted
(74) *Attorney, Agent, or Firm* — Ratnerprestia

(57) ABSTRACT

The invention relates to a composite obtained from a composition comprising: 50 (excluded) to 90% by weight of at least one polyamide; 10 to 50% by weight of polylactic acid (PLA); and 0 to 30% by weight of at least one compatibilizing agent. The invention also relates to a process for manufacturing this composite and its use.

7 Claims, No Drawings

COMPOSITE MATERIAL BASED ON POLYAMIDE AND ON POLY(LACTIC ACID), MANUFACTURING PROCESS AND USE THEREOF

The present invention relates to a composite based on polyamides, especially based on nylon-11 (PA-11), and on polylactic acid (PLA).

Polyamides, in particular the polyundecanamide PA-11, are materials that have both excellent chemical and mechanical properties, properties that they notably retain over time.

However, and by way of example, considering its relatively high cost, PA-11 is only seldom used for manufacturing convenience goods such as, for example, for manufacturing mobile phone or computer parts.

In addition, due to the semi-crystalline character of PA-11, a shrinkage phenomenon occurs during the manufacture of parts, in particular injection-molded parts, produced from PA-11 alone with, consequently, the presence of what are called "sink marks", more particularly at the locations where the part has an excessive thickness. The presence of these sink marks in parts produced from PA-11 thus impairs the surface quality of these parts and therefore, more generally, their aesthetic appearance, which may prove troublesome for some applications.

Polylactic acid, or PLA, is itself widely used in the manufacture of fibers, films and sheets, especially intended for the food industry.

Although PLA has a major advantage due to its biodegradable and renewable properties, it remains seldom used in a certain number of fields due to its particularly low intrinsic mechanical properties.

In particular, the use of PLA for manufacturing consumer goods as mentioned above requires the impact strength and thermomechanical properties of PLA to be improved.

To improve such properties, document JP 2004/051835 describes a composite obtained from a composition of PLA and polyamide having a PLA matrix. In this particular case, the composition described in this document comprises 100 parts by weight of PLA and 1 to 100 parts by weight of a polyamide having a flexural modulus of elasticity at room temperature of less than 2 GPa.

However, for some applications such as those mentioned above (consumer goods), it has been observed that the mechanical and thermomechanical properties of the composite having a PLA matrix described in document JP 2004/051835 are still not entirely satisfactory.

Furthermore, the composite having a PLA matrix described in document JP 2004/051835 is no longer satisfactory in terms of durability. Indeed, it has been observed that this composite does not withstand hydrolysis over time.

The object of the present invention is therefore to overcome the aforementioned disadvantages and to provide a composite that simultaneously has the advantages of the polyamides and of the lactic acid without their respective disadvantages.

Thus, the composite according to the invention must especially be provided with good thermomechanical strength, excellent mechanical properties, and especially an elongation at break greater than 200% at room temperature, a good impact strength and also good durability (that may especially be evaluated by a measurement of the elongation at break after hydrolysis). It must, in addition, make it possible to manufacture articles in which the presence of sink marks is considerably reduced so as to be imperceptible to the naked eye. In other words, the shrinkage after injection molding should be as small as possible.

The present invention therefore relates to a composite of the aforementioned type, that is to say a composite which is obtained from a composition comprising a polyamide and PLA.

According to the invention, said composite is obtained from a composition comprising at least one polyamide and PLA, the polyamide constituting the matrix.

More particularly, the composition comprises:
50 (excluded) to 90% by weight of at least one polyamide;
10 to 50% by weight of PLA; and
0 to 30% by weight, advantageously 5 to 15% by weight, of at least one compatibilizing agent.

Preferably, the composition does not comprise polyoxymethylene (POM).

The composition may comprise a single polyamide or a blend of several polyamides.

Advantageously, the polyamide is a semi-crystalline polyamide.

The term "semi-crystalline" covers homopolyamides and copolyamides which have both a glass transition temperature $T_g$ and a melting temperature $T_m$.

The expression "semi-crystalline polyamides" is directed more particularly to aliphatic homopolyamides resulting from the condensation:
of a lactam,
of an aliphatic alpha,omega-aminocarboxylic acid,
of an aliphatic diamine and an aliphatic diacid.

Examples of aliphatic alpha,omega-aminocarboxylic acid include aminocaproic acid, 7-aminoheptanoic acid, 11-aminoundecanoic acid and 12-aminododecanoic acid.

Examples of lactam include caprolactam, oenantholactam and lauryllactam.

Examples of aliphatic diamine include hexamethylenediamine, dodecamethylenediamine and trimethylhexamethylenediamine.

Examples of aliphatic diacid include adipic acid, azelaic acid, suberic acid, sebacic acid and dodecanedicarboxylic acid.

The aliphatic polyamides include, by way of example and without limitation, the following polyamides: polycaprolactam (PA-6); polyundecanamide (PA-11); polylauryllactam (PA-12); polybutyleneadipamide (PA-4,6); polyhexamethyleneadipamide (PA-6,6); polyhexamethyleneazelamide (PA-6,9); polyhexamethylenesebacamide (PA-6,10); polyhexamethylenedodecanamide (PA-6,12); polydecamethylenedodecanamide (PA-10,12); polydecamethylenesebacanamide (PA-10,10) and polydodecamethylenedodecanamide (PA-12,12).

The expression "semi-crystalline polyamides" is also directed to cycloaliphatic homopolyamides.

Mention may be made more particularly of the cycloaliphatic polyamides resulting from the condensation of a cycloaliphatic diamine and an aliphatic diacid.

Examples of cycloaliphatic diamine include 4,4'-methylene-bis(cyclohexylamine), also called para-bis(aminocyclohexyl)methane or PACM, and 2,2'-dimethyl-4,4'-methylenebis(cyclohexylamine), also called bis(3-methyl-4-aminocyclohexyl)methane or BMACM.

Accordingly, among semi-crystalline polyamides, mention may be made of the polyamides PA-PACM,12, resulting from the condensation of PACM with the C12 diacid, and PA-BMACM,10 and PA-BMACM,12, resulting from the condensation of BMACM with C10 and C12 aliphatic diacids respectively.

The expression "semi-crystalline polyamides" is also directed to the semi-aromatic homopolyamides which result from the condensation:
- of an aliphatic diamine and an aromatic diacid such as terephthalic acid (T) and isophthalic acid (I). The polyamides obtained are in this case commonly referred to as "polyphthalamides" or PPAs;
- of an aromatic diamine, such as xylylenediamine, and more particularly metaxylylenediamine (MXD), and an aliphatic diacid.

Accordingly, without limitation, mention may be made of the polyamides PA-6,T, PA-6,I, PA-MXD,6 or else PA-MXD,10.

As indicated previously, the expression "semi-crystalline polyamides" also covers the copolyamides which result from the condensation of at least two of the compounds set out above for obtaining homopolyamides. Accordingly the copolyamides cover more particularly the products of condensation:
- of at least two lactams,
- of at least two aliphatic alpha,omega-aminocarboxylic acids,
- of at least one lactam and of at least one aliphatic alpha,omega-aminocarboxylic acid,
- of at least two diamines and at least two diacids,
- of at least one lactam with at least one diamine and at least one diacid,
- of at least one aliphatic alpha,omega-aminocarboxylic acid with at least one diamine and at least one diacid, it being possible for the diamine or diamines and diacid or diacids to be, independently of one another, aliphatic, cycloaliphatic or aromatic.

Among the copolyamides, mention may especially be made of PA-11/10,T.

Obviously, the semi-crystalline polyamide will be chosen so that it has a melting point that is compatible with the conditions for manufacturing and converting the composite according to the invention.

The substitution of an amount of polyamide by PLA makes it possible to obtain a composite having a polyamide matrix which retains the remarkable mechanical, thermomechanical and durability properties of the polyamide.

Furthermore, in comparison with a material exclusively formed from polyamide, this substitution has a real economic advantage as it decreases the cost of the raw materials. This economic advantage adds to the technical advantage linked to the restriction of the shrinkage of the material.

More particularly advantageously, it is possible to choose a semi-crystalline polyamide that is obtained from monomers which are, completely or partially, renewable. In particular, the polyamide could be chosen from PA-11, PA-10, PA-6,10 and PA-10,10.

PA-6,10, or polyhexamethylene sebacamide, is a polyamide that results from the condensation of hexamethylenediamine with sebacic acid whereas PA-10,10, or polydecamethylene sebacamide, is a polyamide that results from the condensation of 1,10-decanediamine with sebacic acid.

As PA-10, PA-11, PA-6,10, PA-10,10 and PLA are polymers obtained from monomers which have, completely or partly, the property of being renewable according to the ASTM D6866 standard, the ecological advantage of the present invention is undeniable.

Additionally, this ecological advantage is reinforced by the fact that by substituting some of the polyamide with PLA, the emission rate of $CO_2$, which is produced during the manufacture of the composite according to the invention, is reduced.

Polylactic acid may be formed from levorotatory (L) monomers and/or dextrorotatory (D) monomers, the ratio of (L) and (D) monomers possibly being any.

Polylactic acid may obviously be a blend of several PLAs. It may be a blend of levorotatory PLA (PLLA), which is formed from predominantly (L) monomers, and of dextrorotatory PLA (PDLA), which is formed from predominantly (D) monomers.

The PLAs that are currently available commercially may be used within the context of the invention.

According to one variant, the composition comprises a content of one or more of the polyamides mentioned above between 50% and 90% by weight, the value of 50% by weight being excluded.

In a first advantageous version of the invention, the composition comprises 50 to 70% by weight of at least one polyamide, preferably chosen from PA-10, PA-11, PA-6,10 and PA-10,10, the value of 50% by weight being excluded.

In a second advantageous version of the invention, the composition comprises 30 to 50% by weight of PLA.

In a third advantageous version of the invention, the composition comprises 5 to 15% by weight of at least one compatibilizing agent.

In one particularly advantageous version of the invention, the composite is obtained from the following polymers:
- 50 (value excluded) to 70% by weight of at least one polyamide, preferably chosen from PA-10, PA-11, PA-6,10 and PA-10,10;
- 30 to 50% of PLA; and
- 5 to 15% by weight of at least one compatibilizing agent.

Advantageously, the compatibilizing agent is a functionalized polyolefin comprising α-olefin units and units chosen from epoxide, carboxylic acid and carboxylic acid anhydride units.

Preferably, the functionalized polyolefin is chosen from the group composed of an ethylene/acrylic ester/maleic anhydride terpolymer, and an ethylene/methyl acrylate/glycidyl methacrylate terpolymer.

Among the terpolymers mentioned above, use may especially be made of those sold, by Arkema France, under the trademark LOTADER®.

In one variant of the invention, the composition may, in addition, comprise fibers, these fibers possibly being natural fibers or synthetic fibers.

It is observed that a composite according to the invention into which fibers are introduced has a high deflection temperature under load that is substantially improved relative to a composition comprising at least one polyamide and PLA, but having a PLA matrix.

The weight content of fibers is, advantageously, between 0 and 60%, preferably between 5 and 30%, of the total composition.

Such fibers may especially be glass fibers, carbon fibers, kenaf fibers, bamboo fibers or else cellulose fibers.

In another variant of the invention, the composition may additionally comprise mineral fillers such as talc or calcium carbonate.

Other inorganic fillers can be envisaged; nanofillers, such as montmorillonite or carbon nanotubes, may also be used.

The addition of fibers or of mineral fillers makes it possible, in particular, to enhance the mechanical properties such as the flexural modulus, the tensile modulus and also the stiffness of the composite according to the invention.

In another variant of the invention, the composition may, in addition, comprise at least one additive chosen from plasticizers, impact modifiers, dyes, pigments, brighteners, antioxidants, flame retardants, UV stabilizers and unfunctionalized polyolefins.

An unfunctionalized polyolefin is a homopolymer or copolymer of α-olefins or diolefins.

The present invention also relates to a process for manufacturing the composite which has just been described.

According to the invention, this process comprises a step of blending the various polymers according to the techniques conventionally used in the field of polymers and, especially, by compounding, for example by means of a twin-screw extruder.

In addition, the present invention also relates to the use of such a composite for manufacturing an article and also to an article manufactured from such a composite, and especially to a compression-molded, injection-molded, extruded or thermoformed article.

Owing to the presence of PLA, it has been observed that articles produced from the composite according to the present invention are of better quality, especially because they have a visible surface, at least when observed with the naked eye, free from sink marks.

The present invention will now be illustrated by particular exemplary embodiments which will be described below and which use PA-11 as the polyamide. It is specified that these examples in no way aim to limit the scope of the present invention.

EXAMPLE (TRIALS 1 TO 8)

Within the context of trials 1 to 8, the procedure for preparing the composites was identical, with the exception of the weight proportions of the polymers and, if appropriate, the fillers (glass fibers) used.

The polylactic acid, or PLA, used within the context of trials 1 to 8 is sold by Natureworks, under the reference 2002D.

The nylon-11, or PA-11, used within the context of trials 1 to 8 is sold by Arkema France, under the reference RILSAN® BECNO TL.

The terpolymer used within the context of trials 3, 4, 7 and 8 is an ethylene (67 wt %)/methyl acrylate (25 wt %)/glycidyl methacrylate (8 wt %) terpolymer, sold by Arkema France, under the reference LOTADER® AX8900.

The glass fibers used in trials 7 and 8 have a length of 250 microns after conversion. They are sold by Asahi under the reference CS FT 692.

In trials 3 to 8, the various polymers in the form of granules and, if appropriate, the glass fibers were introduced simultaneously into a twin-screw extruder (JSW TEX30) in order to be blended (throughput: 15 kg/h, rotational speed 300 rpm, temperature 210° C.).

The weight proportions of each of the polymers and fillers used in trials 1 to 8 are given in Table 1 below.

TABLE 1

| Trial | PA-11 (parts by weight) | PLA (parts by weight) | Terpolymer (parts by weight) | Glass fibers (parts by weight) |
|---|---|---|---|---|
| 1 | 100 | 0 | 0 | 0 |
| 2 | 0 | 100 | 0 | 0 |
| 3 | 60 | 30 | 10 | 0 |
| 4 | 20 | 65 | 15 | 0 |
| 5 | 70 | 30 | 0 | 0 |
| 6 | 30 | 70 | 0 | 0 |
| 7 | 18 | 59 | 14 | 9 |
| 8 | 59 | 18 | 14 | 9 |

The composite obtained on exiting the twin-screw extruder was in the form of granules.

The granules formed from the compositions of trials 1 to 6 were then injection-molded at a temperature of 230° C. in a mold that was thermally controlled at a temperature of 40° C. After a hold for a time of 30 seconds in said mold, dumbbells corresponding to the criteria of the ASTM1 standard were obtained.

The dumbbells obtained were then subjected to various tests which, except where indicated otherwise, were carried out at room temperature in order to determine the following characteristics:

the longitudinal shrinkage was measured along the length direction of the dumbbell. This first criterion makes it possible to qualitatively study the surface appearance of the dumbbells, in particular the presence, whether visible or not, of sink marks: the smaller the shrinkage, the less pronounced the "sink marks" will be;

the tensile modulus and elongation at break were measured, using a tensile testing machine equipped with an extensometer (according to ASTM D638), at 1 mm/min and 50 mm/min respectively. This second criterion makes it possible to assess the final mechanical properties of the dumbbells; and for the hydrolysis, the dumbbells were immersed for 5 days in a sealed tank containing deionized water set at 80° C. This third criterion, combined with the previous one, makes it possible to assess the hydrolysis resistance and consequently the durability of the dumbbells.

The measurements obtained are given in Table 2 below.

TABLE 2

| | Trial | | | | | |
|---|---|---|---|---|---|---|
| | 1 | 2 | 3 | 4 | 5 | 6 |
| Longitudinal shrinkage (%) | 1.0% | 0.26% | 0.57% | 0.36% | 0.62% | 0.32% |
| Tensile modulus (MPa) | 1000 | 2600 | 1370 | 1950 | 1500 | 2300 |
| Elongation at break (%) | 280% | 8% | 260% | 72% | 260% | 150% |
| Elongation at break after hydrolysis (%) | 280% | <1% | 260% | <1% | 260% | <1% |

The dumbbells from trials 3 and 5 each obtained from a composite according to the present invention were more ductile and more resistant to hydrolysis than the dumbbell from trial 2 obtained from PLA alone, while having a lower longitudinal shrinkage and a higher tensile modulus than the dumbbell from trial 1 obtained from PA-11 alone.

In addition, the dumbbells from trials 3 and 5 having a PA-11 matrix had noticeably improved mechanical and durability properties relative, respectively, to the dumbbells from trials 4 and 6 having a PLA matrix.

The dumbbells from trials 3 and 5 obtained from the composites according to the invention therefore combine the advantages of the polymers that form them.

The granules formed from the compositions of trials 7 and 8 were injection-molded at a temperature of 210° C. in a mold that was thermally controlled at a temperature of 80° C. After cooling for a time of 40 seconds in said mold, bars corresponding to the criteria of the ISO 75 standard were obtained.

TABLE 3

| Trial | 7 | 8 |
|---|---|---|
| HDT 0.45 MPa ISO 75 (° C.) | 56 | 171 |
| Demolding | difficult | easy |

Table 3 shows that the deflection temperature under load (or heat distortion temperature "HDT" measured according to the ISO 75 standard) is substantially higher for the blend 8 according to the invention. It was furthermore noted that the demolding is easier for trial 8.

The composite according to the invention may of course be used for manufacturing articles, such as the consumer goods indicated above. In a non-limiting manner, mention may be made of the manufacture of compression-molded articles, injection-molded articles, extruded articles or thermoformed articles. The latter may be in the form of films, sheets, tubes, etc.

The invention claimed is:

1. A composite composition comprising:
  greater than 50% to 85% by weight, with respect to the total weight of the composition, of at least one polyamide, wherein the polyamide comprises a semi-crystalline polyamide selected from the group consisting of PA-10, PA-11, PA-6,10 and PA-10,10;
  10 to 45% by weight, with respect to the total weight of the composition, of polylactic acid (PLA);
  5 to 30% by weight, with respect to the total weight of the composition, of at least one functionalized polyolefin comprising α-olefin units and units selected from the group consisting of epoxide, carboxylic acid, and carboxylic acid anhydride; and
  5 to 30% by weight of natural or synthetic fibers, with respect to the total weight of the composition.

2. The composite composition as claimed in claim 1, wherein the functionalized polyolefin is selected from the group consisting of
  an ethyleneacrylic estermaleic anhydride terpolymer; and
  an ethylenemethyl acrylateglycidyl methacrylate terpolymer.

3. The composite composition as claimed in claim 1, wherein the fibers are glass fibers.

4. The composite composition as claimed in claim 1, wherein the composition further comprises at least one additive selected from the group consisting of plasticizers, impact modifiers, unfunctionalized polyolefins, dyes, pigments, brighteners, antioxidants and UV stabilizers.

5. An article comprising the composite composition of claim 1.

6. The composite composition of claim 1, comprising greater than 50% to 65% by weight of at least one polyamide, 30 to 45% by weight of polylactic acid (PLA); and 5 to 15% by weight of at least one functionalized polyolefin comprising α-olefin units and units selected from the group consisting of epoxide, carboxylic acid, and carboxylic acid anhydride.

7. The article of claim 5, wherein said article is a compression-molded article, an injection-molded article, an extruded article or a thermoformed article.

* * * * *